United States Patent
Noda

(10) Patent No.: US 8,008,889 B2
(45) Date of Patent: Aug. 30, 2011

(54) CHARGING CIRCUIT FOR SECONDARY BATTERY, POWER SUPPLY SWITCHING METHOD IN CHARGING CIRCUIT FOR SECONDARY BATTERY, AND POWER SUPPLY UNIT

(75) Inventor: Ippei Noda, Osaka (JP)

(73) Assignee: Ricoh Company, Ltd., Tokyo (JP)

( * ) Notice: Subject to any disclaimer, the term of this patent is extended or adjusted under 35 U.S.C. 154(b) by 972 days.

(21) Appl. No.: 11/918,542

(22) PCT Filed: Feb. 2, 2007

(86) PCT No.: PCT/JP2007/052301
§ 371 (c)(1),
(2), (4) Date: Oct. 15, 2007

(87) PCT Pub. No.: WO2007/094246
PCT Pub. Date: Aug. 23, 2007

(65) Prior Publication Data
US 2009/0115374 A1    May 7, 2009

(30) Foreign Application Priority Data
Feb. 15, 2006   (JP) .................. 2006-037506

(51) Int. Cl.
*H02J 7/00* (2006.01)
*H01M 2/10* (2006.01)
*G05F 1/00* (2006.01)

(52) U.S. Cl. ........ 320/110; 320/106; 320/107; 320/113; 320/125; 429/99; 429/149; 429/150; 323/242; 323/281; 323/313

(58) Field of Classification Search .............. 320/110
See application file for complete search history.

(56) References Cited

U.S. PATENT DOCUMENTS

| | | | |
|---|---|---|---|
| 6,445,162 B1* | 9/2002 | Mukainakano | 320/132 |
| 6,580,251 B2* | 6/2003 | Takeuchi | 320/138 |
| 2001/0017531 A1* | 8/2001 | Sakakibara et al. | 320/106 |
| 2003/0111908 A1* | 6/2003 | Christensen | 307/43 |
| 2004/0053082 A1* | 3/2004 | McCluskey et al. | 429/9 |

FOREIGN PATENT DOCUMENTS

| | | |
|---|---|---|
| JP | 09-322432 | 12/1997 |
| JP | 11-196540 | 7/1999 |
| JP | 2004-147409 | 5/2004 |
| JP | 2004-227805 | 8/2004 |
| WO | WO-2005/004304 | 1/2005 |

* cited by examiner

*Primary Examiner* — Edward Tso
*Assistant Examiner* — Yalkew Fantu
(74) *Attorney, Agent, or Firm* — Dickstein Shapiro LLP

(57) ABSTRACT

A charging circuit charges a secondary battery by using a first direct current power supply that generates and outputs a first voltage. A highest voltage among the first voltage of the first direct current power supply, a second voltage generated from power supplied from outside, and a secondary battery voltage of the secondary battery is supplied as a power supply to the charging circuit.

36 Claims, 9 Drawing Sheets

CHARGING CIRCUIT FOR SECONDARY BATTERY, POWER SUPPLY SWITCHING METHOD IN CHARGING CIRCUIT FOR SECONDARY BATTERY, AND POWER SUPPLY UNIT

TECHNICAL FIELD

The present invention relates to charging circuits for secondary batteries, power supply switching methods performed in charging circuits for secondary batteries, and power supply units for usage in compact-type portable electronic devices such as mobile phones and laptop computers, and in particular, to a charging circuit for a secondary battery, a power supply switching method performed in a charging circuit for a secondary battery, and a power supply unit in which a low-voltage direct current power supply such as a fuel battery or a solar battery is used as a primary power supply, and voltage output from the direct current power supply is boosted to charge the secondary battery.

BACKGROUND ART

In recent years and continuing, protection of the global environment and energy savings are becoming major concerns. Accordingly, fuel batteries and solar batteries, which have low impacts on the environment, are increasingly adopted as power supplies for portable devices. With the implementation of digital terrestrial broadcasting and next generation communication standards, the amount of power consumed by mobile phones is particularly increasing, which reduces the battery standby time. Furthermore, laptop computers are required to have longer continuous operation times. Thus, low-power-consumption devices and high-energy-density batteries are desired for addressing such issues.

Solar batteries and fuel batteries have higher energy density compared to lithium-ion batteries; however, their power generating voltage per cell is generally low, at 0.3 V-1.23 V, and thus cannot drive a load with such a low voltage. Furthermore, as solar batteries and fuel batteries have extremely low output density, a so-called hybrid configuration is employed. Specifically, in such a hybrid configuration, the power generating voltage is boosted by a booster circuit, the boosted voltage is stored in a secondary battery that is connected in parallel and has a high-output-density, and the power generating voltage is supplied from the secondary battery to the load. However, it is extremely difficult to drive the booster circuit and a control circuit thereof with such a low voltage.

One approach is to provide a storage unit to supply voltage for driving the control circuit of the booster converter. First, power is supplied from the storage unit to the control circuit to activate the booster converter, and after the booster converter is activated, output from the booster converter is used to drive the control circuit. Subsequently, a switch and a countercurrent preventing unit are used to separate the storage unit from the load and the control circuit. Accordingly, a low-voltage direct current power supply can be used as the main power supply for driving the load, and the capacity of the storage unit can be small. This technology makes it possible to drive the load even if the power generating voltage is lower than the voltage required for activating the booster circuit (see, for example, Patent Document 1).

Patent Document 1: Japanese Laid-Open Patent Application No. 2004-147409

However, in the above-described technology, when a portable device is abandoned for a long time without output voltage from the main power supply, an electrical current slightly leaks from the switch and the countercurrent preventing unit, or a natural self-discharge of the storage unit is caused. Therefore, the voltage of the storage unit drops to a level at which the control circuit cannot be activated. As a result, the booster converter cannot be activated, power cannot be supplied from the main power supply to the load, and the device becomes permanently unusable.

DISCLOSURE OF THE INVENTION

The present invention provides a charging circuit for a secondary battery, a power supply switching method performed in a charging circuit for a secondary battery, and a power supply unit in which one or more of the above-described disadvantages are eliminated.

A preferred embodiment of the present invention provides a charging circuit for a secondary battery, a power supply switching method performed in a charging circuit, and a power supply unit with a charging circuit for a secondary battery, in which a low-voltage direct current power supply such as a fuel battery or a solar battery is employed as a main power supply, and even if the voltage of the direct current power supply used as the main power supply is lower than a voltage required for driving a charging circuit, it is possible to control the operation of charging a secondary battery, ensure that a device corresponding to the load is operable under any circumstance, and minimize power supplied from the direct current power supply that has only a limited amount of power, such that efficiency is enhanced.

An embodiment of the present invention provides a charging circuit for charging a secondary battery by using a first direct current power supply that generates and outputs a first voltage, the charging circuit including a charging circuit unit configured to charge the secondary battery with the first voltage received from the first direct current power supply; and a power supply switching circuit unit configured to receive the first voltage from the first direct current power supply, a second voltage generated from power supplied from outside, and a secondary battery voltage from the secondary battery, and supply as a power supply a highest voltage among the received voltages to the charging circuit unit.

An embodiment of the present invention provides a charging circuit for charging a secondary battery by using a first direct current power supply that generates and outputs a first voltage, the charging circuit including a charging circuit unit configured to charge the secondary battery with the first voltage received from the first direct current power supply; a booster circuit unit configured to boost the first voltage by a predetermined boosting ratio to generate and output a third voltage; and a power supply switching circuit unit configured to receive the first voltage from the first direct current power supply, the third voltage from the booster circuit unit, and a secondary battery voltage from the secondary battery, and supply as a power supply a highest voltage among the received voltages to the charging circuit unit.

An embodiment of the present invention provides a charging circuit for charging a secondary battery by using a first direct current power supply that generates and outputs a first voltage, the charging circuit including a charging circuit unit configured to charge the secondary battery with the first voltage received from the first direct current power supply; a booster circuit unit configured to boost the first voltage by a predetermined boosting ratio to generate and output a third voltage; and a power supply switching circuit unit configured to receive the first voltage from the first direct current power supply, a second voltage generated from power supplied from outside, the third voltage from the booster circuit unit, and a secondary battery voltage from the secondary battery, and supply as a power supply a highest voltage among the received voltages to the charging circuit unit.

An embodiment of the present invention provides a charging circuit for charging a secondary battery by using a first direct current power supply that generates and outputs a first voltage, the charging circuit including a charging circuit unit configured to charge the secondary battery with the first voltage received from the first direct current power supply; and a power supply switching circuit unit configured to receive the first voltage from the first direct current power supply and a secondary battery voltage from the secondary battery, and supply as a power supply a higher voltage of the received voltages to the charging circuit unit.

An embodiment of the present invention provides a power supply switching method in a charging circuit for charging a secondary battery by using a first direct current power supply that generates and outputs a first voltage, the method including a step of supplying as a power supply a highest voltage among the first voltage of the first direct current power supply, a second voltage generated from power supplied from outside, and a secondary battery voltage of the secondary battery to the charging circuit.

An embodiment of the present invention provides a power supply switching method in a charging circuit for charging a secondary battery by using a first direct current power supply that generates and outputs a first voltage, the method including a step of supplying as a power supply a highest voltage among the first voltage of the first direct current power supply, a third voltage generated by boosting the first voltage, and a secondary battery voltage of the secondary battery to the charging circuit.

An embodiment of the present invention provides a power supply switching method in a charging circuit for charging a secondary battery by using a first direct current power supply that generates and outputs a first voltage, the method including a step of supplying as a power supply a highest voltage among the first voltage of the first direct current power supply, a second voltage generated from power supplied from outside, a third voltage generated by boosting the first voltage, and a secondary battery voltage of the secondary battery to the charging circuit.

An embodiment of the present invention provides a power supply switching method in a charging circuit for charging a secondary battery by using a first direct current power supply that generates and outputs a first voltage, the method including a step of supplying as a power supply a higher voltage of the first voltage of the first direct current power supply and a secondary battery voltage of the secondary battery to the charging circuit.

An embodiment of the present invention provides a power supply unit for charging a secondary battery and supplying a secondary battery voltage of the secondary battery to a load, the power supply unit including a first direct current power supply configured to generate and output a first voltage; a charging circuit configured to charge the secondary battery by using the first voltage received from the first direct current power supply; and a second direct current power supply configured to generate a second voltage from power supplied from outside and output the second voltage; wherein the charging circuit includes a charging circuit unit configured to charge the secondary battery with the first voltage received from the first direct current power supply, and a power supply switching circuit unit configured to receive the first voltage from the first direct current power supply, the second voltage from the second direct current power supply, and the second-ary battery voltage from the secondary battery, and supply as a power supply a highest voltage among the received voltages to the charging circuit unit.

An embodiment of the present invention provides a power supply unit for charging a secondary battery and supplying a secondary battery voltage of the secondary battery to a load, the power supply unit including a first direct current power supply configured to generate and output a first voltage; and a charging circuit configured to charge the secondary battery by using the first voltage received from the first direct current power supply; wherein the charging circuit includes a charging circuit unit configured to charge the secondary battery with the first voltage received from the first direct current power supply, a booster circuit unit configured to boost the first voltage by a predetermined boosting ratio to generate and output a third voltage, and a power supply switching circuit unit configured to receive the first voltage from the first direct current power supply, the secondary battery voltage from the secondary battery, and the third voltage from the booster circuit unit, and supply as a power supply a highest voltage among the received voltages to the charging circuit unit.

An embodiment of the present invention provides a power supply unit for charging a secondary battery and supplying a secondary battery voltage of the secondary battery to a load, the power supply unit including a first direct current power supply configured to generate and output a first voltage; a charging circuit configured to charge the secondary battery by using the first voltage received from the first direct current power supply; and a second direct current power supply configured to generate a second voltage from power supplied from outside and output the second voltage; wherein the charging circuit includes a charging circuit unit configured to charge the secondary battery with the first voltage received from the first direct current power supply, a booster circuit unit configured to boost the first voltage by a predetermined boosting ratio to generate and output a third voltage, and a power supply switching circuit unit configured to receive the first voltage from the first direct current power supply, the second voltage from the second direct current power supply, the secondary battery voltage from the secondary battery, and the third voltage from the booster circuit unit, and supply as a power supply a highest voltage among the received voltages to the charging circuit unit.

An embodiment of the present invention provides a power supply unit for charging a secondary battery and supplying a secondary battery voltage of the secondary battery to a load, the power supply unit including a first direct current power supply configured to generate and output a first voltage; and a charging circuit configured to charge the secondary battery by using the first voltage received from the first direct current power supply; wherein the charging circuit includes a charging circuit unit configured to charge the secondary battery with the first voltage received from the first direct current power supply, and a power supply switching circuit unit configured to receive the first voltage from the first direct current power supply and the secondary battery voltage from the secondary battery, and supply as a power supply a higher voltage of the received voltages to the charging circuit unit.

BEST MODE FOR CARRYING OUT THE INVENTION

A description is given, with reference to the accompanying drawings, of an embodiment of the present invention.

First Embodiment

Figure 1:
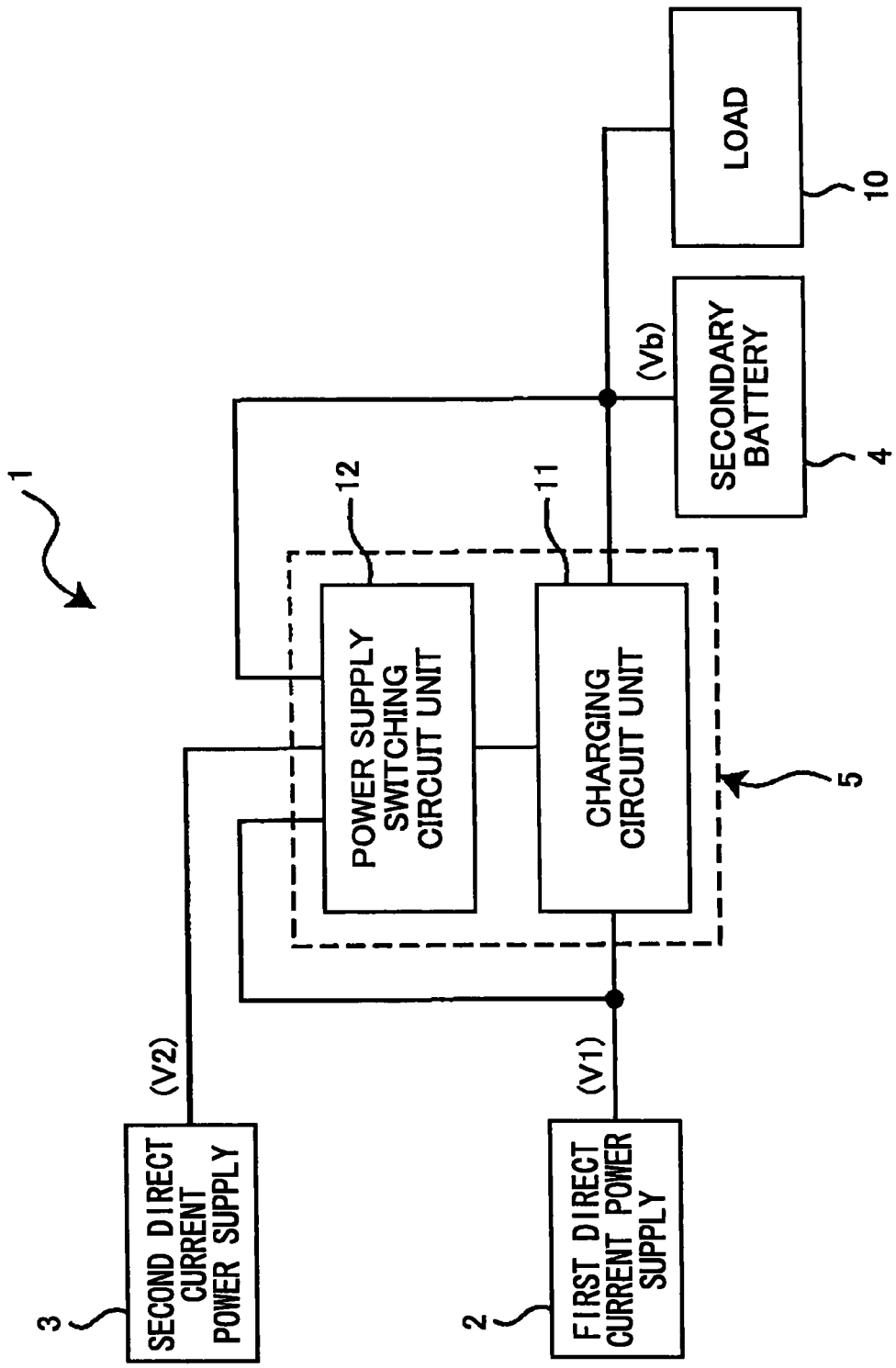
FIG. 1 is a block diagram of a power supply unit including a charging circuit for charging a secondary battery according to a first embodiment of the present invention.

FIG. 1 is a block diagram of a power supply unit including a charging circuit for charging a secondary battery according to a first embodiment of the present invention.

As shown in FIG. 1, a power supply unit 1 includes a first direct current power supply 2 including a fuel battery or a solar battery that generates and outputs a first voltage V1, a second direct current power supply 3 that generates and outputs a predetermined second voltage V2 based on power supplied from outside, for example, from an AC adaptor, a secondary battery 4 configured with a lithium-ion battery, and a charging circuit 5 that charges the secondary battery 4 with a voltage obtained by boosting the first voltage V1 from the first direct current power supply 2.

The charging circuit 5 includes a charging circuit unit 11 that charges the secondary battery 4 with a voltage obtained by boosting the first voltage V1 output from the first direct current power supply 2, and a power supply switching circuit unit 12 that detects the first voltage V1, the second voltage V2, and a secondary battery voltage Vb that is a battery voltage of the secondary battery 4, selects one of the first voltage V1, the second voltage V2, or the secondary battery voltage Vb, and supplies the selected voltage as power supply to the charging circuit unit 11. The power supply switching circuit unit 12 receives voltages from the first direct current power supply 2, the second direct current power supply 3, and the secondary battery 4, detects the voltage levels of the first voltage V1, the second voltage V2, and the secondary battery voltage Vb input thereto, and outputs the highest voltage as power supply to the charging circuit unit 11. The charging circuit unit 11 operates by using as power supply the voltage received from the power supply switching circuit unit 12.

A description is given of an example in which a fuel battery is employed as the first direct current power supply 2 serving as a main power supply, and a lithium-ion battery is employed as the secondary battery 4 in the above-described configuration.

When the second voltage V2 is received from the second direct current power supply 3, the voltage level of the second voltage V2 is usually the highest, and the power supply switching circuit unit 12 outputs the second voltage V2 as power supply to the charging circuit unit 11. If, for some reason, the second voltage V2 output from the second direct current power supply 3 is lower than the first voltage V1 output from the first direct current power supply 2 (fuel battery) and the secondary battery voltage Vb, the higher voltage of the received first voltage V1 and the secondary battery voltage Vb is output as power supply to the charging circuit unit 11. The secondary battery voltage Vb of the charged secondary battery 4 (lithium-ion battery) is generally 3.2 V-4.4 V according to its discharge property. The secondary battery voltage Vb is usually higher than the first voltage V1, and the power supply switching circuit unit 12 supplies as power supply the secondary battery voltage Vb to the charging circuit unit 11.

Figure 2:
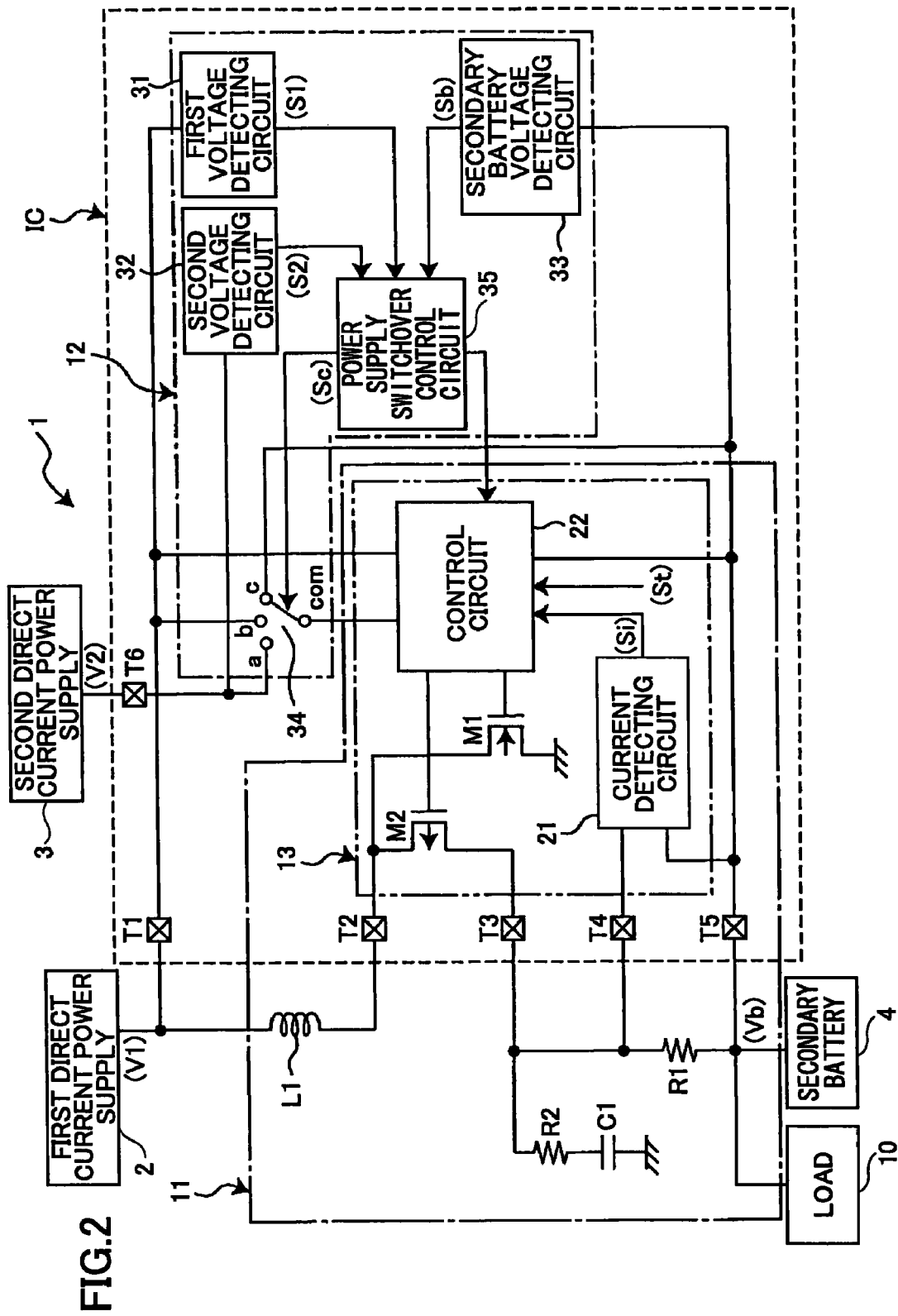
FIG. 2 is a block diagram of the internal configuration of a charging circuit unit and a power supply switching circuit unit shown in FIG. 1.

FIG. 2 is a block diagram of the internal configuration of the charging circuit unit 11 and the power supply switching circuit unit 12 shown in FIG. 1.

As shown in FIG. 2, the charging circuit unit 11 includes an inductor L1, a capacitor C1, resistances R1, R2, and a charging control circuit 13. The charging control circuit 13 includes a switching element M1 configured with an NMOS transistor that performs switching operations to control the output of the first voltage V1 from the first direct current power supply 2 (fuel battery) and a synchronous rectification switching element M2 configured with a PMOS transistor. Furthermore, the charging control circuit 13 includes a current detecting circuit 21 and a control circuit 22. The current detecting circuit 21 detects a charging current supplied to the secondary battery 4 (lithium-ion battery) based on a voltage drop accross the resistance R1, which resistance R1 is used for current detection, and generates and outputs a signal Si indicating the detected current level. The control circuit 22 controls an operation for switching between the switching element M1 and the synchronous rectification switching element M2 according to the signal Si from the current detecting circuit 21 and the secondary battery voltage Vb.

The power supply switching circuit unit 12 includes a first voltage detecting circuit 31, a second voltage detecting circuit 32, a secondary battery voltage detecting circuit 33, a switchover switch 34, and a power supply switchover control circuit 35. The first voltage detecting circuit 31 detects the voltage level of the first voltage V1 from the first direct current power supply 2 (fuel battery) and generates and outputs a signal S1 indicating the detected voltage level. The second voltage detecting circuit 32 detects the voltage level of the second voltage V2 from the second direct current power supply 3 and generates and outputs a signal S2 indicating the detected voltage level. The secondary battery voltage detecting circuit 33 detects the voltage level of the secondary battery voltage Vb from the secondary battery 4 (lithium-ion battery) and generates and outputs a signal Sb indicating the detected voltage level. The switchover switch 34 exclusively outputs one of the first voltage V1, the second voltage V2, and the secondary battery voltage Vb according to a control signal received. The power supply switchover control circuit 35 determines the highest voltage among the first voltage V1, the second voltage V2, and the secondary battery voltage Vb based on signals received from the first voltage detecting circuit 31, the second voltage detecting circuit 32, and the secondary battery voltage detecting circuit 33, and controls the switchover switch 34 to output the determined voltage to some of or all of elements configuring the charging circuit unit 11 including the control circuit 22. The power supply switching circuit unit 12 and the charging control circuit 13 are integrated on a single IC. The IC also includes terminals T1-T6.

The first voltage V1 is input via the terminal T1 to a terminal b of the switchover switch 34 and the first voltage detecting circuit 31. The inductor L1 is externally provided between the terminal T1 and the terminal T2, and a series circuit configured with the resistance R2 and the capacitor C1 is externally provided between the terminal T3 and ground voltage. The switching element M1 is connected between the terminal T2 and ground voltage, and the synchronous rectification switching element M2 is connected between the terminal T2 and the terminal T3. Gates of the switching element M1 and the synchronous rectification switching element M2 are connected to the control circuit 22, and the control circuit 22 performs a switching control operation to switch between the switching element M1 and the synchronous rectification switching element M2.

The terminal T3 and the terminal T4 are connected to each other externally, the resistance R1 is connected between the terminal T4 and the terminal T5, and the terminal T4 and the terminal T5 are connected to the current detecting circuit 21. The secondary battery voltage Vb is input to the control circuit 22, a terminal c of the switchover switch 34, and the secondary battery voltage detecting circuit 33, via the terminal T5. A load 10 is connected to the terminal T5 and receives power supply. The control circuit 22 is connected to a common terminal com of the switchover switch 34, and receives power supply from the common terminal com. The switchover switch 34 is controlled according to a control signal Sc from the power supply switchover control circuit 35. The second voltage V2 is input to a terminal a of the switchover switch 34 and the second voltage detecting circuit 32 via the terminal T6.

In the above-described configuration, the control circuit 22 charges the secondary battery 4 (lithium-ion battery) with either a constant current or a constant voltage. To supply a constant current, the control circuit 22 detects the current supplied to the secondary battery 4 (lithium-ion battery) based on the signal Si received from the current detecting circuit 21. The control circuit 22 performs PWM control or PFM control to cause the switching element M1 to perform a switching operation such that the detected charging current becomes constant at a predetermined level. Furthermore, the control circuit 22 causes the synchronous rectification switching element M2 to perform a switching operation contrary to that of the switching element M1. When the switching element M1 is turned on and becomes conductive and the synchronous rectification switching element M2 is turned off and becomes cutoff, energy is stored in the inductor L1.

Subsequently, when the switching element M1 is turned off and becomes cutoff and the synchronous rectification switching element M2 is turned on and becomes conductive, the energy stored in the inductor L1 is added to the first voltage V1 and output to the terminal T3, smoothed by the resistance R2 and the condenser C1 so that the first voltage V1 is boosted, and supplied to the secondary battery 4 (lithium-ion battery).

Figure 3:
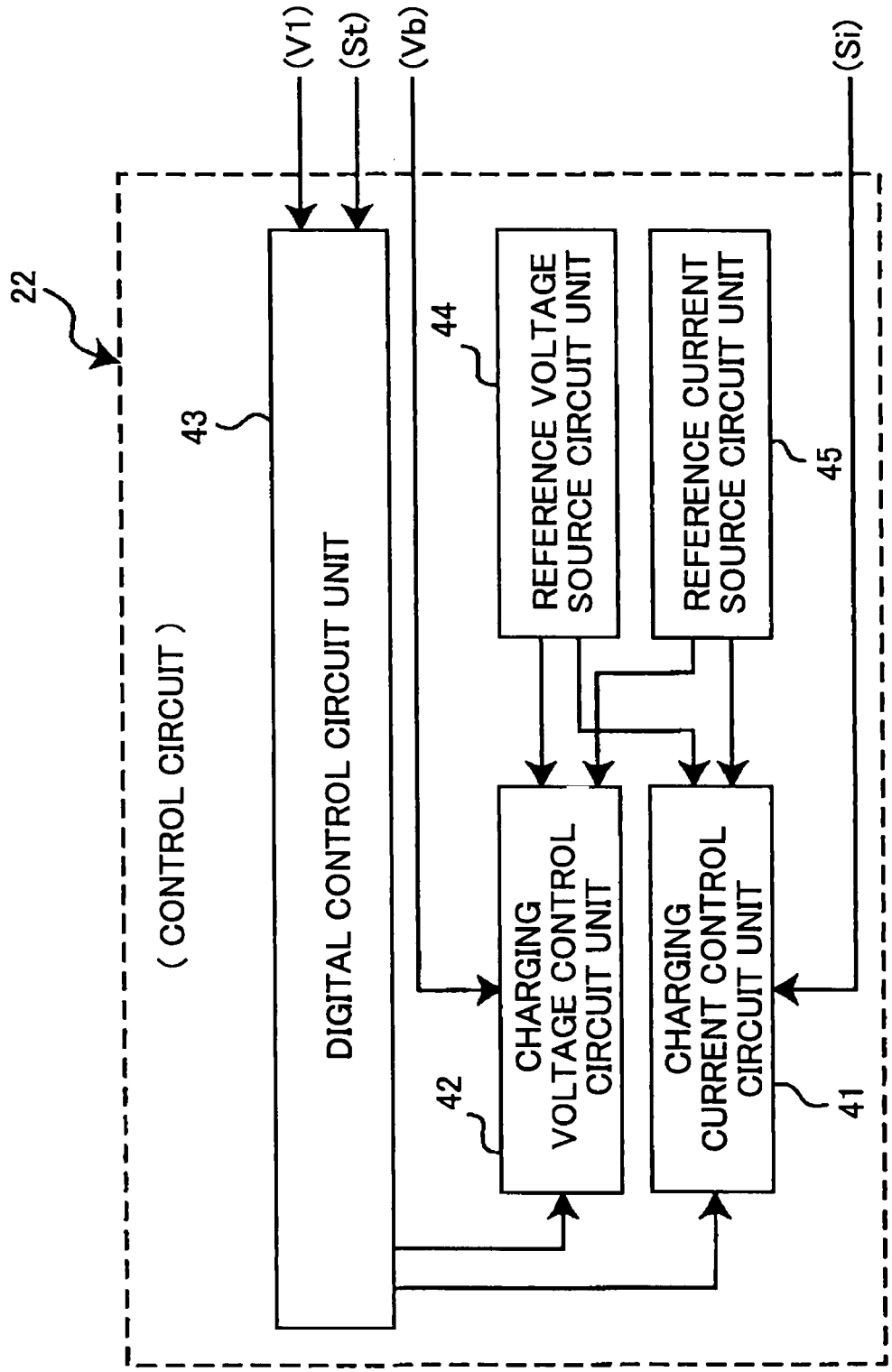
FIG. 3 is a schematic block diagram of the internal configuration of a control circuit shown in FIG. 2.

FIG. 3 is a schematic block diagram of the internal configuration of the control circuit 22.

As shown in FIG. 3, the control circuit 22 includes a charging current control circuit unit 41 and a charging voltage control circuit unit 42. The charging current control circuit unit 41 performs switching control operations on the switching element M1 and the synchronous rectification switching element M2 so that the secondary battery 4 (lithium-ion battery) is charged with a constant voltage. The control circuit 22 also includes a digital control circuit unit 43, a reference voltage source circuit unit 44, and a reference current source circuit unit 45. The digital control circuit unit 43 controls operations of the charging current control circuit unit 41 and the charging voltage control circuit unit 42 to follow a predetermined charging control flow. The reference voltage source circuit unit 44 supplies a predetermined reference voltage to the charging current control circuit unit 41 and the charging voltage control circuit unit 42. The reference current source circuit unit 45 supplies a predetermined reference current to the charging current control circuit unit 41 and the charging voltage control circuit unit 42.

The digital control circuit unit 43 monitors the first voltage V1 of the first direct current power supply 2 (fuel battery) and determines whether power can be supplied from the first direct current power supply 2 (fuel battery). For example, when it is determined that power cannot be supplied from the first direct current power supply 2 (fuel battery), the digital control circuit unit 43 controls operations of the charging voltage control circuit unit 42 and the charging current control circuit unit 41 to turn off both the switching element M1 and the synchronous rectification switching element M2 and to stop charging the secondary battery 4 (lithium-ion battery). The digital control circuit unit 43 receives a temperature detection signal St from, e.g., a temperature sensor (not shown) that detects the temperature of the secondary battery 4 (lithium-ion battery). When it is determined based on the temperature detection signal St that the temperature of the secondary battery 4 (lithium-ion battery) is abnormal, e.g., higher than or equal to a predetermined value, the digital control circuit unit 43 causes the charging voltage control circuit unit 42 and the charging current control circuit unit 41 to turn off both the switching element M1 and the synchronous rectification switching element M2 and to stop charging the secondary battery 4 (lithium-ion battery).

Next, operations of the power supply switching circuit unit 12 are described below.

The power supply switchover control circuit 35 determines the highest voltage among the first voltage V1, the second voltage V2, and the secondary battery voltage Vb based on the signal S1 received from the first voltage detecting circuit 31, the signal S2 received from the second voltage detecting circuit 32, and the signal Sb received from the secondary battery voltage detecting circuit 33, and controls the switchover switch 34 to supply the determined voltage to some of or all of elements configuring the charging circuit unit 11 including the control circuit 22. For example, when the second voltage V2 is highest, the power supply switchover control circuit 35 controls the switchover switch 34 so that the common terminal com is connected to the terminal a. The switchover switch 34 includes a switch element and a diode element, and shuts off an unintended current path between different power supplies. If the switchover switch 34 is configured with a MOS transistor, the parasite diode of the MOS transistor can be used instead of the diode.

As described above, in the charging circuit 5 for charging the secondary battery 4 according to the first embodiment of the present invention, the power supply switching circuit unit 12 detects the highest voltage among the first voltage V1 generated by the first direct current power supply 2 such as a fuel battery or a solar battery, the second voltage V2 generated by the second direct current power supply 3 based on power supply from outside such as an AC adaptor, and the secondary battery voltage Vb of the secondary battery 4. The power supply switching circuit unit 12 then outputs the highest voltage as power supply to the charging circuit unit 11. The charging circuit unit 11 operates by using as power supply the voltage received from the power supply switching circuit unit 12. Accordingly, even if the secondary battery 4 is charged by using a direct current power supply such as a fuel battery or a solar battery having a lower voltage than a voltage required for driving the charging circuit 5, it is possible to charge the secondary battery 4, ensure that a device corresponding to the load 10 is operable under any circumstance, and minimize power supplied from the direct current power supply that has only a limited amount of power, such that efficiency is enhanced.

Second Embodiment

In the first embodiment, the second direct current power supply generates the second voltage V2 based on power supply received from outside, such as from an AC adaptor. In a second embodiment according to the present invention, instead of the second direct current power supply, a booster circuit that boosts the first voltage V1 from the first direct current power supply is employed.

Figure 4:
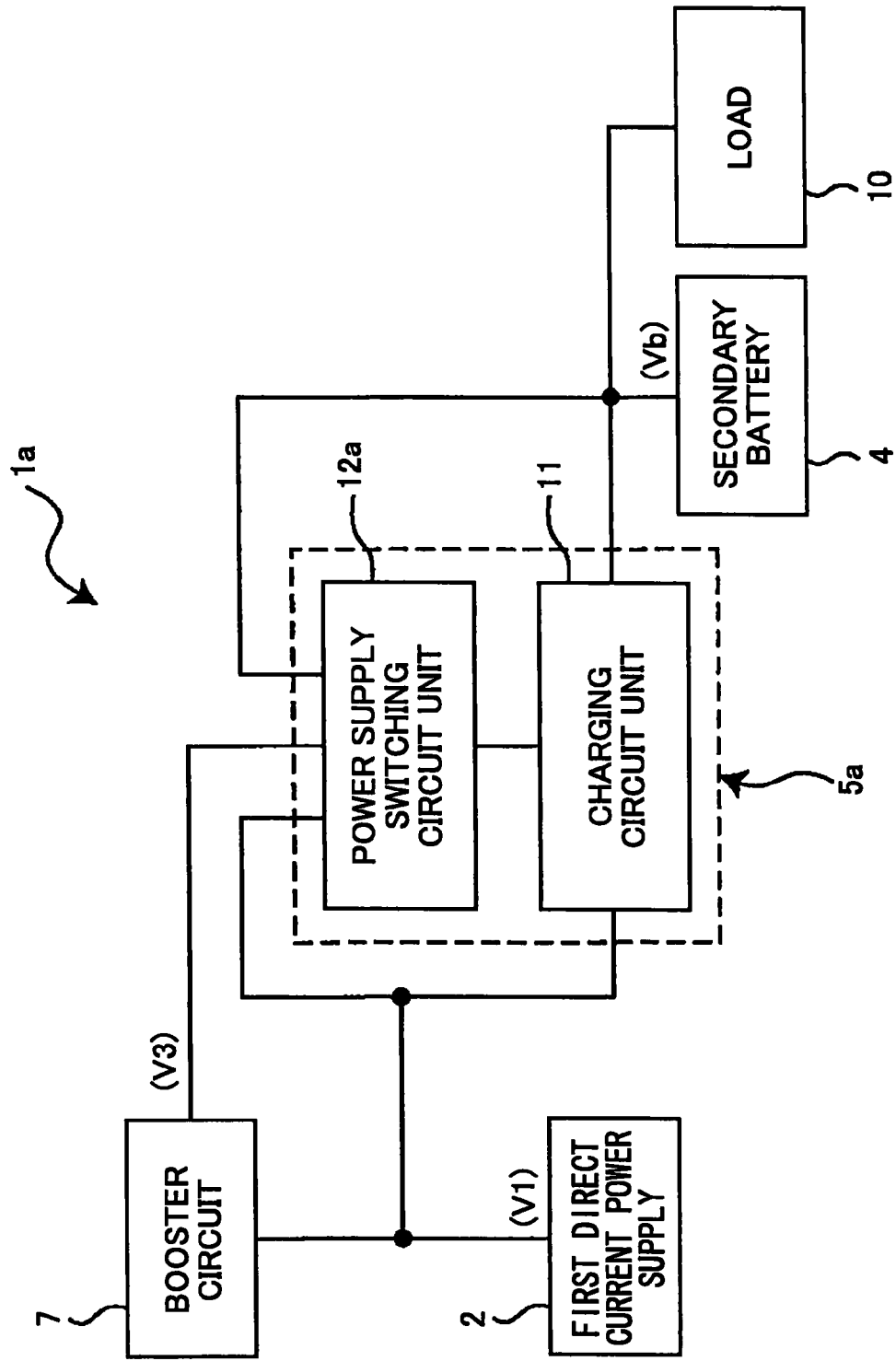
FIG. 4 is a block diagram of a power supply unit including a charging circuit for charging a secondary battery according to a second embodiment of the present invention.

FIG. 4 is a block diagram of a power supply unit including a charging circuit for charging a secondary battery according to the second embodiment of the present invention. In FIG. 4, elements corresponding to those in FIG. 1 are denoted by the same reference numbers, and are not further described. Only the differences between FIG. 4 and FIG. 1 are described herein.

The differences between FIG. 4 and FIG. 1 are that a booster circuit 7 is provided instead of the second direct current power supply 3 shown in FIG. 1. Accordingly, the power supply switching circuit unit 12 shown in FIG. 1 is replaced with a power supply switching circuit unit 12a, the charging circuit 5 shown in FIG. 1 is replaced with a charging circuit 5a, and the power supply unit 1 shown in FIG. 1 is replaced with a power supply unit 1a.

As shown in FIG. 4, the power supply unit 1a includes the first direct current power supply 2, the booster circuit 7 that boosts the first voltage V1 output from the first direct current power supply 2 to generate and output a third voltage V3, the secondary battery 4, and the charging circuit 5a. The booster circuit 7 is a capacitor type circuit, and can operate even with low voltage.

The charging circuit 5a includes the charging circuit unit 11 and the power supply switching circuit unit 12a that detects the first voltage V1 and the secondary battery voltage Vb that is the voltage of the secondary battery 4, selects one of the first voltage V1, the third voltage V3, and the secondary battery voltage Vb, and outputs the selected voltage as power supply to the charging circuit unit 11. The charging circuit unit 11 operates by using as power supply the voltage received from the power supply switching circuit unit 12a.

The power supply switching circuit unit 12a recognizes the boosting ratio initially specified in the booster circuit 7 by using a storage unit, etc. Therefore, the voltage level of the third voltage V3 can be detected by detecting the voltage level of the first voltage V1. Accordingly, a circuit for detecting the third voltage V3 is unnecessary so that device can be made compact. The power supply switching circuit unit 12a receives voltages from the first direct current power supply 2, the booster circuit 7, and the secondary battery 4, and outputs as power supply to the charging circuit unit 11 the highest voltage among the first voltage V1, the third voltage V3, and the secondary battery voltage Vb. The charging circuit unit 11 operates by using as power supply the voltage received from the power supply switching circuit unit 12a.

A description is given of an example in which a fuel battery is employed as the first direct current power supply 2 serving as a main power supply, and a lithium-ion battery is employed as the secondary battery 4 in the above-described configuration.

The secondary battery voltage Vb of the charged secondary battery 4 (lithium-ion battery) is generally 3.2 V-4.4 V according to its discharge property. This is sufficient for driving the charging circuit unit 11. Therefore, the power supply switching circuit unit 12a determines that the secondary battery 4 (lithium-ion battery) is optimum, and the secondary battery 4 (lithium-ion battery) is used as the power supply for the charging circuit unit 11.

As energy of the first direct current power supply 2 (fuel battery) is limited, unless it is replenished with fuel, the output voltage drops and it becomes incapable of supplying power. If the first direct current power supply 2 (fuel battery) is not replenished with fuel and becomes incapable of supplying power to the secondary battery 4 (lithium-ion battery), the voltage of the secondary battery 4 (lithium-ion battery) also drops. As a result, a device serving as the load 10 cannot be driven.

In such a situation, information reporting that there is a fuel shortage is sent from the device to a user, and the user replenishes the first direct current power supply 2 (fuel battery) with fuel. When the first direct current power supply 2 (fuel battery) is replenished with fuel, the first direct current power supply 2 (fuel battery) can start supplying power again. However, at this point, the secondary battery 4 (lithium-ion battery) is in an over-discharged status and cannot supply a sufficient voltage for driving the charging circuit unit 11. In such a situation, the power supply switching circuit unit 12a determines that the booster circuit 7 is the optimum power supply, and the booster circuit 7 is used as the power supply for the charging circuit unit 11. For example, when the first direct current power supply 2 (fuel battery) includes plural cells arranged in series in a stacked manner, and is capable of supplying a voltage sufficient for driving the charging circuit unit 11, the power supply switching circuit unit 12a determines that the first direct current power supply 2 (fuel battery) is optimum, and the first direct current power supply 2 (fuel battery) can be used as the power supply of the charging circuit unit 11.

If the first direct current power supply 2 (fuel battery) cannot have plural cells arranged in a stacked manner so that the portable device can be made compact, and the first direct current power supply 2 (fuel battery) is incapable of supplying a voltage required for driving the charging circuit unit 11, the power supply switching circuit unit 12a determines that the booster circuit 7 is the optimum power supply, and the booster circuit 7 is used as the power supply for charging the charging circuit unit 11.

As described above, the power supply switching circuit unit 12a can estimate the third voltage V3 output from the booster circuit 7 based on the boosting ratio and the first voltage V1 input to the booster circuit 7. The booster circuit 7 is not operated under normal circumstances; the booster circuit 7 is operated only when the power supply switching circuit unit 12a selects the booster circuit 7. Thus, the reactive power of the power supply unit 1a can be significantly reduced.

Figure 5:
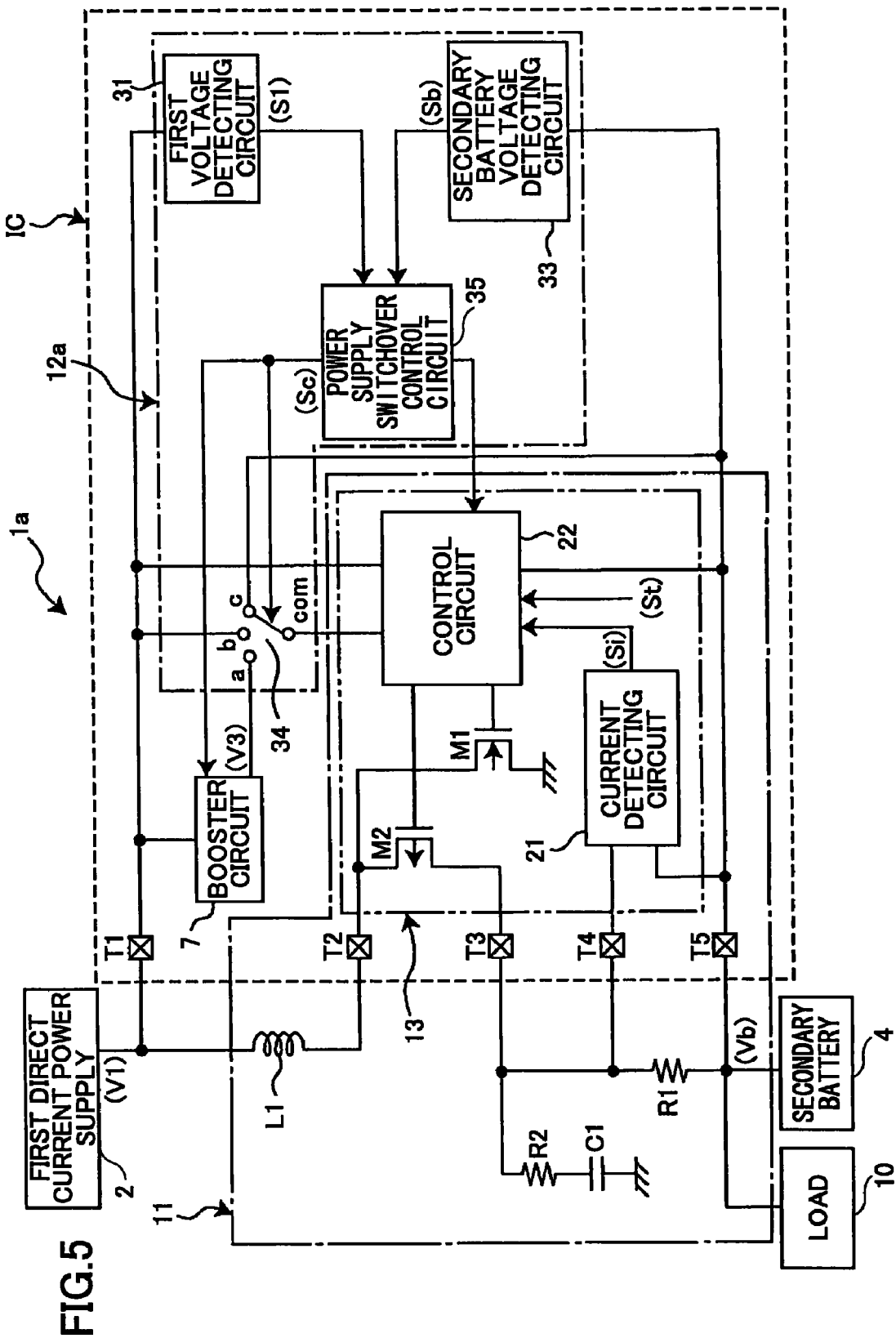
FIG. 5 is a block diagram of the internal configuration of a charging circuit unit and a power supply switching circuit unit shown in FIG. 4.

FIG. 5 is a block diagram of the internal configuration of the charging circuit unit 11 and the power supply switching circuit unit 12a shown in FIG. 4. In FIG. 5, elements corresponding to those in FIG. 2 are denoted by the same reference numbers. Configurations and operations of the charging circuit unit 11 shown in FIG. 5 are the same as those described with FIG. 2, and are thus not further described.

As shown in FIG. 5, the power supply switching circuit unit 12a includes the first voltage detecting circuit 31 and the secondary battery voltage detecting circuit 33. The first voltage detecting circuit 31 detects the voltage level of the first voltage V1 from the first direct current power supply 2 (fuel battery) and generates and outputs the signal S1 indicating the detected voltage level. The secondary battery voltage detecting circuit 33 detects the voltage level of the secondary battery voltage Vb from the secondary battery 4 (lithium-ion battery) and generates and outputs the signal Sb indicating the detected voltage level.

Furthermore, the power supply switching circuit unit 12a includes the switchover switch 34 and the power supply switchover control circuit 35. The switchover switch 34 exclusively outputs one of the first voltage V1, the third voltage V3, and the secondary battery voltage Vb according to a control signal received. The power supply switchover control circuit 35 determines the highest voltage among the first voltage V1, the third voltage V3, and the secondary battery voltage Vb based on signals received from the first voltage detecting circuit 31 and secondary battery voltage detecting circuit 33, and controls the switchover switch 34 to output the determined voltage to some of or all of elements configuring the charging circuit unit 11 including the control circuit 22. The booster circuit 7; the switching element M1, the synchronous rectification switching element M2, the current detecting circuit 21, and the control circuit 22 included in the charging circuit unit 11; and the power supply switching circuit unit 12a are integrated on a single IC. The IC also includes terminals T1-T5.

The terminal T3 and the terminal T4 are connected to each other externally, the resistance R1 is connected between the terminal T4 and the terminal T5, and the terminal T4 and the terminal T5 are connected to the current detecting circuit 21. The secondary battery voltage Vb is input to the control circuit 22, the terminal c of the switchover switch 34, and the secondary battery voltage detecting circuit 33, via the terminal T5. The load 10 is connected to the terminal T5 and receives power supply. The control circuit 22 is connected to the common terminal com of the switchover switch 34, and receives power supply from the common terminal com. The switchover switch 34 is controlled according to the control signal Sc from the power supply switchover control circuit 35. The booster circuit 7 is controlled according to the control signal Sc from the power supply switchover control circuit 35. The third voltage V3 is input to the terminal a of the switchover switch 34.

In the above-described configuration, the first voltage detecting circuit 31 and the secondary battery voltage detecting circuit 33 detect the connection status and the output voltage of the first direct current power supply 2 (fuel battery) and the secondary battery 4 (lithium-ion battery), respectively. The first voltage detecting circuit 31 and the secondary battery voltage detecting circuit 33 respectively output to the power supply switchover control circuit 35 the signal S1 and the signal Sb indicating the detection results. The power supply switchover control circuit 35 controls the switchover switch 34 according to the signals S1 and Sb so that power for some of or all of elements configuring the charging circuit unit 11 including the control circuit 22 is supplied via the switchover switch 34 from the optimum power supply among the first direct current power supply 2 (fuel battery), the secondary battery 4 (lithium-ion battery), and the booster circuit 7.

Furthermore, when the power supply switchover control circuit 35 controls the switchover switch 34 so that the power is supplied from a power supply other than the booster circuit 7, the power supply switchover control circuit 35 stops the operation of the booster circuit 7.

In the booster circuit 7, the boosting ratio between the input voltage and the output voltage is specified arbitrarily. By detecting the first voltage V1 of the first direct current power supply 2 (fuel battery), which is the input voltage, the third voltage V3 to be output from the booster circuit 7 can also be detected at the same time based on the boosting ratio. Therefore, there need not be provided a circuit for detecting the third voltage V3 of the booster circuit 7; however, a circuit for detecting the third voltage V3 can be provided for simplifying the power supply switchover control circuit 35.

As described above, in the charging circuit 5 for charging the secondary battery 4 according to the second embodiment of the present invention, the power supply switching circuit unit 12a detects the highest voltage among the first voltage V1 generated by the first direct current power supply 2 such as a fuel battery or a solar battery, the third voltage V3 generated by boosting the first voltage V1 at the booster circuit 7, and the secondary battery voltage Vb that is the voltage of the secondary battery 4. The power supply switching circuit unit 12a then outputs the highest voltage as power supply to the charging circuit unit 11. The charging circuit unit 11 operates by using as power supply the voltage received from the power supply switching circuit unit 12a. Accordingly, the same effects as those of the first embodiment can be achieved. Furthermore, the booster circuit 7 is not operated when unnecessary, and therefore, consumption of reactive power from the fuel battery can be reduced, such that the continuous operation time of the portable device can be significantly extended.

Third Embodiment

The booster circuit according to the second embodiment can be provided in the charging circuit according to the first embodiment. A third embodiment according to the present invention has this configuration.

Figure 6:
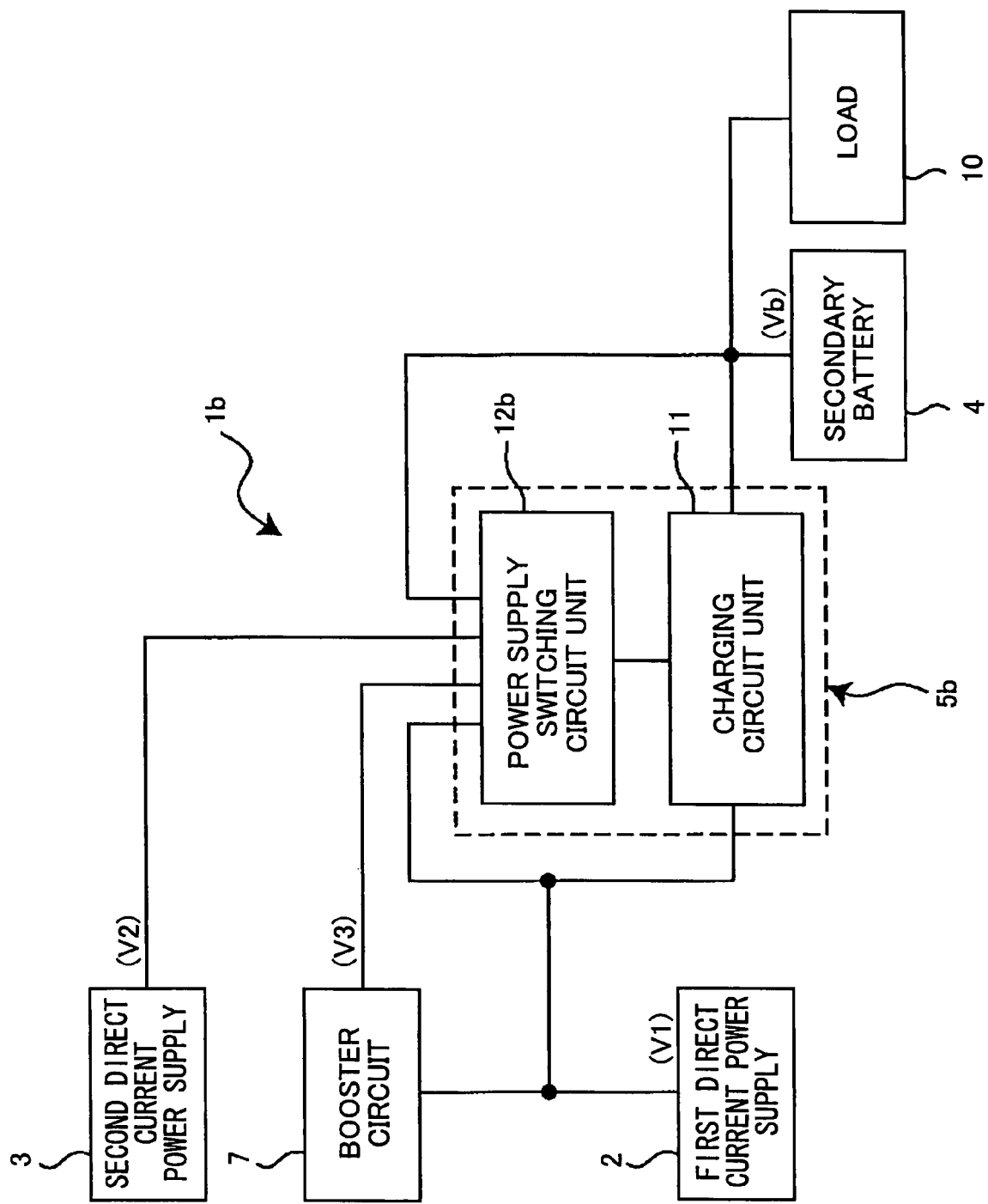
FIG. 6 is a block diagram of a power supply unit including a charging circuit for charging a secondary battery according to a third embodiment of the present invention.

FIG. 6 is a block diagram of a power supply unit including a charging circuit for charging a secondary battery according to the third embodiment of the present invention. In FIG. 6, elements corresponding to those in FIG. 1 or 4 are denoted by the same reference numbers, and are not further described. Only the difference between FIG. 6 and FIG. 1 is described herein.

The difference between FIG. 6 and FIG. 1 is that the booster circuit 7 shown in FIG. 4 is provided in the power supply unit 1 shown in FIG. 1. Accordingly, the power supply switching circuit unit 12 shown in FIG. 1 is replaced with a power supply switching circuit unit 12b, the charging circuit 5 shown in FIG. 1 is replaced with a charging circuit 5b, and the power supply unit 1 shown in FIG. 1 is replaced with a power supply unit 1b.

As shown in FIG. 6, the power supply unit 1b includes the first direct current power supply 2, the second direct current power supply 3, the secondary battery 4, the charging circuit 5b, and the booster circuit 7.

The charging circuit 5b includes the charging circuit unit 11 and the power supply switching circuit unit 12b that detects the first voltage V1, the second voltage V2, the third voltage V3, and the secondary battery voltage Vb, selects one of the first voltage V1, the second voltage V2, the third voltage V3, and the secondary battery voltage Vb, and outputs the selected voltage as power supply to the charging circuit unit 11.

The power supply switching circuit unit 12b recognizes the boosting ratio initially specified in the booster circuit 7 by using a storage unit, etc. Thus, by detecting the voltage level of the first voltage V1, it is possible to detect the voltage level of the third voltage V3. Accordingly, a circuit for detecting the third voltage V3 is unnecessary so that device can be made compact. The power supply switching circuit unit 12b receives voltages from the first direct current power supply 2, the second direct current power supply 3, the booster circuit 7, and the secondary battery 4, and outputs as power supply to the charging circuit unit 11 the highest voltage among the first voltage V1, the second voltage V2, the third voltage V3, and the secondary battery voltage Vb. The charging circuit unit 11 operates by using as power supply the voltage received from the power supply switching circuit unit 12b.

A description is given of an example in which a fuel battery is employed as the first direct current power supply 2 serving as a main power supply, and a lithium-ion battery is employed as the secondary battery 4 in the above-described configuration.

When the second voltage V2 is received from the second direct current power supply 3, the voltage level of the second voltage V2 is usually the highest, and the power supply switching circuit unit 12b outputs the second voltage V2 as power supply to the charging circuit unit 11. If, for some reason, the second voltage V2 output from the second direct current power supply 3 is lower than the first voltage V1 output from the first direct current power supply 2 (fuel battery) and the secondary battery voltage Vb for some reason, the highest voltage among the received first voltage V1, the third voltage V3, and the secondary battery voltage Vb is output as power supply to the charging circuit unit 11.

The secondary battery voltage Vb of the charged secondary battery 4 (lithium-ion battery) is generally 3.2 V-4.4 V according to its discharge property, so that sufficient voltage for driving the charging circuit unit 11 can be supplied. Therefore, the power supply switching circuit unit 12b determines that the secondary battery 4 (lithium-ion battery) is optimum, and the secondary battery 4 (lithium-ion battery) is used as the power supply of the charging circuit unit 11.

As energy of the first direct current power supply 2 (fuel battery) is limited, unless it is replenished with fuel, the output voltage drops and it becomes incapable of supplying power. If the first direct current power supply 2 (fuel battery) is not replenished with fuel and becomes incapable of supplying power to the secondary battery 4 (lithium-ion battery), the voltage of the secondary battery 4 (lithium-ion battery) also drops. As a result, a device serving as the load 10 cannot be driven.

In such a situation, information reporting that there is a fuel shortage is sent from the device to a user, and the user replenishes the first direct current power supply 2 (fuel battery) with fuel. When the first direct current power supply 2 (fuel battery) is replenished with fuel, the first direct current power supply 2 (fuel battery) can start supplying power again. However, at this point, the secondary battery 4 (lithium-ion battery) is in an over-discharged status and cannot supply a voltage sufficient for driving the charging circuit unit 11. In such a situation, the power supply switching circuit unit 12b determines that the booster circuit 7 is the optimum power supply, and the booster circuit 7 is used as the power supply for the charging circuit unit 11. For example, when the first direct current power supply 2 (fuel battery) has a configuration in which plural cells are arranged in series in a stacked manner, and is capable of supplying a voltage sufficient for driving the charging circuit unit 11, the power supply switching circuit unit 12b determines that the first direct current power supply 2 (fuel battery) is optimum, and the first direct current power supply 2 (fuel battery) can be used as the power supply of the charging circuit unit 11.

If the first direct current power supply 2 (fuel battery) cannot have plural cells arranged in a stacked manner so that the portable device can be made compact, and the first direct current power supply 2 (fuel battery) is incapable of supplying a voltage necessary for driving the charging circuit unit 11, the power supply switching circuit unit 12b determines that the booster circuit 7 is the optimum power supply, and the booster circuit 7 is used as the power supply for charging the charging circuit unit 11.

As described above, the power supply switching circuit unit 12b can estimate the third voltage V3 output from the booster circuit 7 based on the boosting ratio and the first voltage V1 input to the booster circuit 7. The booster circuit 7 is not operated under normal circumstances; the booster circuit 7 is operated only when the power supply switching circuit unit 12b selects the booster circuit 7. Thus, the reactive power of the power supply unit 1b can be significantly reduced.

Figure 7:
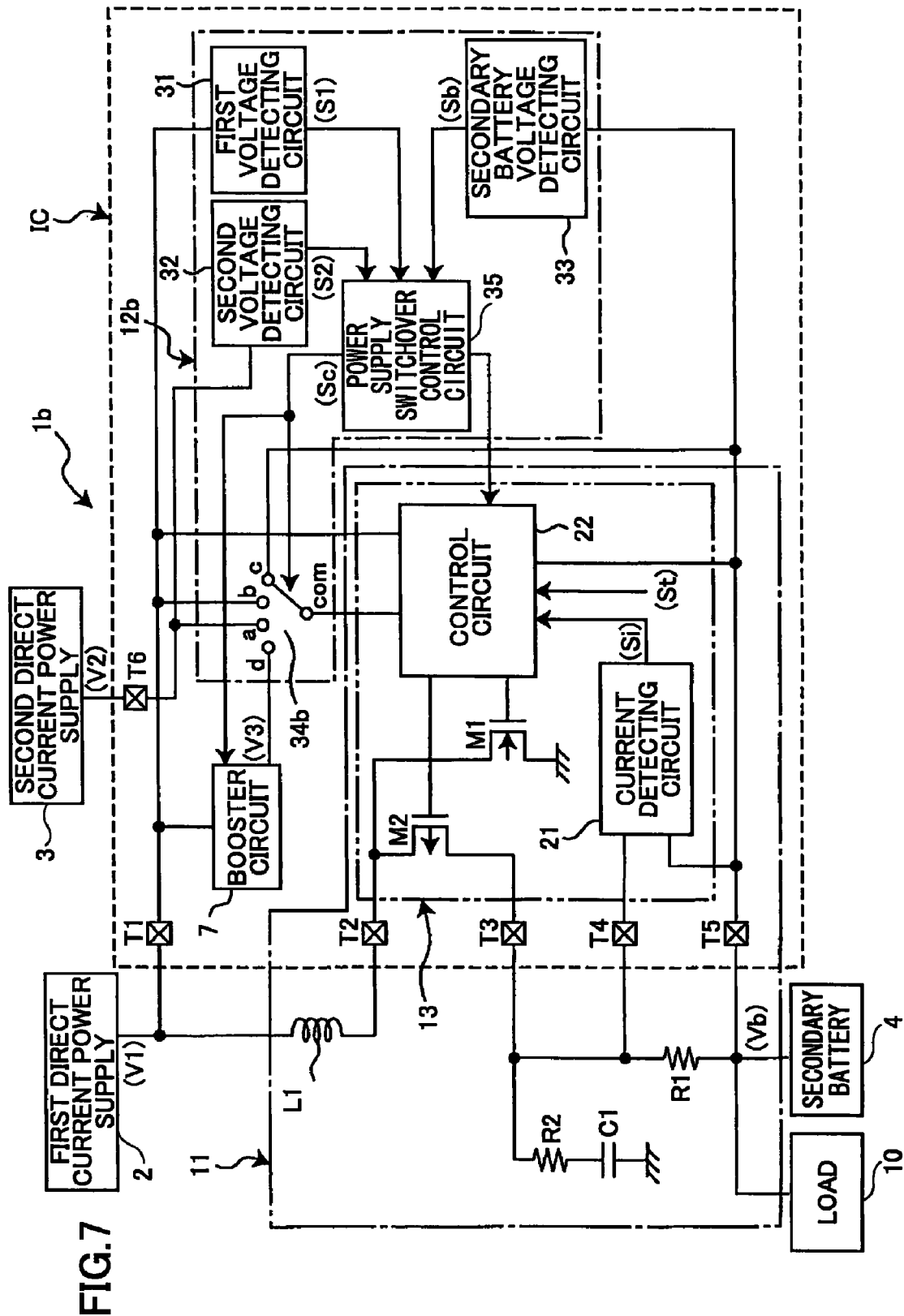
FIG. 7 is a block diagram of the internal configuration of a charging circuit unit and a power supply switching circuit unit shown in FIG. 6.

FIG. 7 is a block diagram of the internal configuration of the charging circuit unit 11 and the power supply switching circuit unit 12b shown in FIG. 6. In FIG. 7, elements corresponding to those in FIG. 2 are denoted by the same reference numbers. Configurations and operations of the charging circuit unit 11 shown in FIG. 7 are the same as those described with FIG. 2, and are thus not further described.

As shown in FIG. 7, the power supply switching circuit unit 12b includes the first voltage detecting circuit 31, the second voltage detecting circuit 32, and the secondary battery voltage detecting circuit 33. The first voltage detecting circuit 31 detects the voltage level of the first voltage V1 from the first direct current power supply 2 (fuel battery) and generates and outputs the signal S1 indicating the detected voltage level. The second voltage detecting circuit 32 detects the voltage level of the second voltage V2 from the second direct current power supply 3 and generates and outputs a signal S2 indicating the detected voltage level. The secondary battery voltage detecting circuit 33 detects the voltage level of the secondary battery voltage Vb from the secondary battery 4 (lithium-ion battery) and generates and outputs the signal Sb indicating the detected voltage level.

Furthermore, the power supply switching circuit unit 12b includes a switchover switch 34b and the power supply switchover control circuit 35. The switchover switch 34b exclusively outputs one of the first voltage V1, the second voltage V2, the third voltage V3, and the secondary battery voltage Vb according to a control signal received. The power supply switchover control circuit 35 determines the highest voltage among the first voltage V1, the second voltage V2, the third voltage V3, and the secondary battery voltage Vb based on signals received from the first voltage detecting circuit 31, the second voltage detecting circuit 32, and the secondary battery voltage detecting circuit 33, and controls the switchover switch 34b to output the determined voltage to some of or all of elements configuring the charging circuit unit 11 including the control circuit 22. The booster circuit 7; the switching element M1, the synchronous rectification switching element M2, the current detecting circuit 21, and the control circuit 22 included in the charging circuit unit 11; and the power supply switching circuit unit 12b are integrated on a single IC. The IC also includes terminals T1-T6.

The switchover switch 34b is controlled according to the control signal Sc from the power supply switchover control circuit 35. Among the terminals of the switchover switch 34b, the second voltage V2 is input to terminal a, the first voltage V1 is input to terminal b, the secondary battery voltage Vb is input to terminal c, and the third voltage V3 is input to terminal d from the booster circuit 7. The control circuit 22 is connected to the common terminal com of the switchover switch 34b, and receives power supply from the common terminal com.

In the above-described configuration, the first voltage detecting circuit 31, the second voltage detecting circuit 32, and the secondary battery voltage detecting circuit 33 detect the connection status and the output voltage of the first direct current power supply 2 (fuel battery), the second direct current power supply 3, and the secondary battery 4 (lithium-ion battery), respectively. The first voltage detecting circuit 31, the second voltage detecting circuit 32, and the secondary battery voltage detecting circuit 33 respectively output to the power supply switchover control circuit 35 the signal S1, the signal S2, and the signal Sb indicating the detection results. The power supply switchover control circuit 35 controls the switchover switch 34b according to the signals S1, S2 and Sb so that power supply for some of or all of elements configuring the charging circuit unit 11 including the control circuit 22 is supplied via the switchover switch 34b from the optimum power supply among the first direct current power supply 2 (fuel battery), the second direct current power supply 3, the secondary battery 4 (lithium-ion battery), and the booster circuit 7.

Furthermore, when the power supply switchover control circuit 35 controls the switchover switch 34b so that the power is supplied from a power supply other than the booster circuit 7 to the control circuit 22, the power supply switchover control circuit 35 stops the operation of the booster circuit 7.

In the booster circuit 7, the boosting ratio between the input voltage and the output voltage is specified arbitrarily. By detecting the first voltage V1 of the first direct current power supply 2 (fuel battery), which is the input voltage, the third voltage V3 to be output from the booster circuit 7 can also be detected at the same time based on the boosting ratio. Therefore, there need not be provided a circuit for detecting the third voltage V3 of the booster circuit 7; however, a circuit for detecting the third voltage V3 can be provided for simplifying the power supply switchover control circuit 35.

As described above, in the charging circuit 5b for the secondary battery 4 according to the third embodiment of the present invention, the power supply switching circuit unit 12b detects the highest voltage among the first voltage V1 generated by the first direct current power supply 2 such as a fuel battery or a solar battery, the second voltage V2 generated by the second direct current power supply 3 based on power supply from outside such as an AC adaptor, the third voltage V3 generated by boosting the first voltage V1 at the booster circuit 7, and the secondary battery voltage Vb that is the voltage of the secondary battery 4. The power supply switching circuit unit 12b then outputs the highest voltage as power supply to the charging circuit unit 11. The charging circuit unit 11 operates by using as power supply the voltage received from the power supply switching circuit unit 12b. Accordingly, the same effects as those of the first and second embodiments can be achieved.

Fourth Embodiment

The first embodiment employs the second direct current power supply that generates the second voltage V2 based on power supply received from outside, such as from an AC adaptor. In a fourth embodiment according to the present invention, the second direct current power supply is omitted, and only the first direct current power supply is provided.

Figure 8:
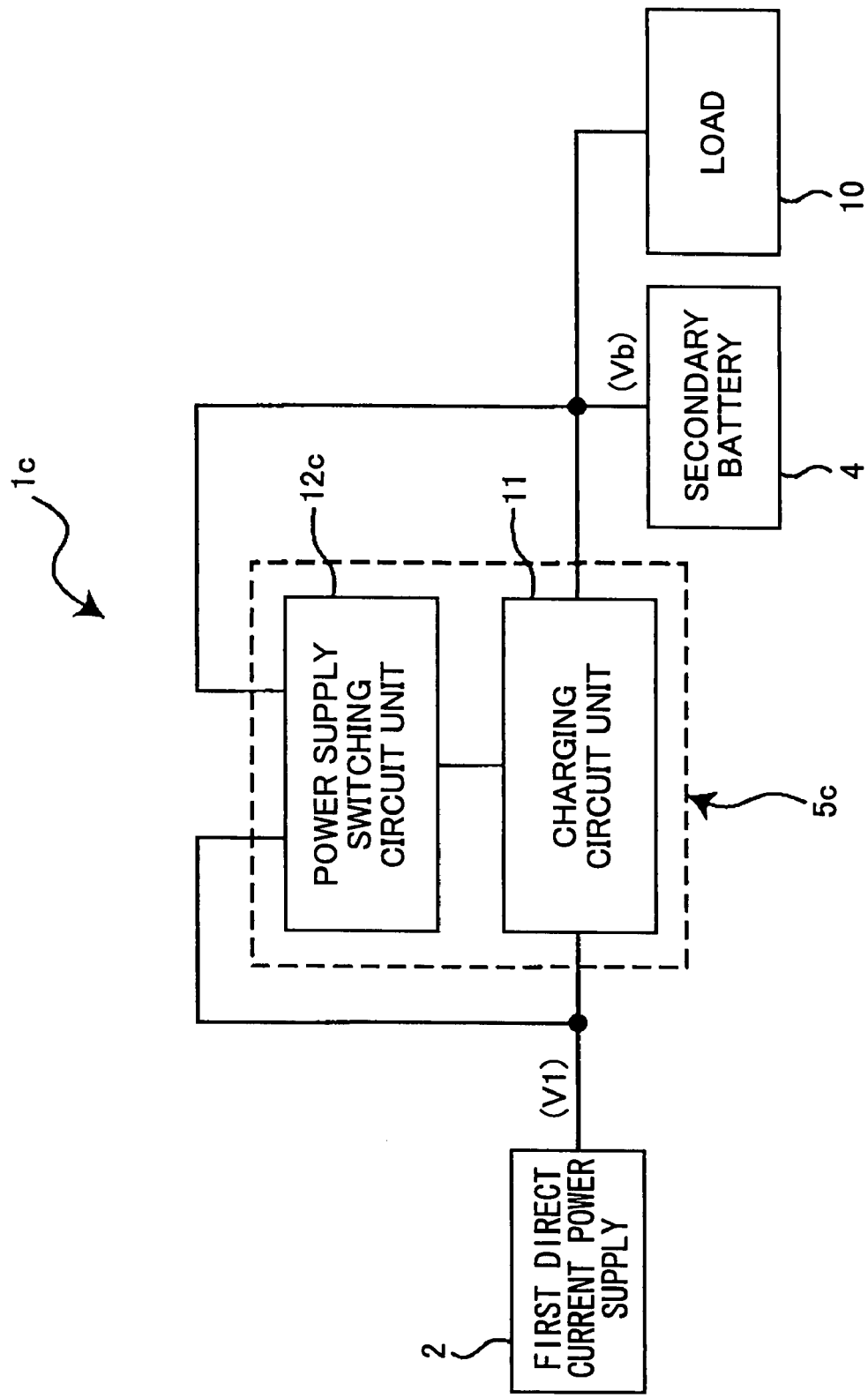
FIG. 8 is a block diagram of a power supply unit including a charging circuit for charging a secondary battery according to a fourth embodiment of the present invention.

FIG. 8 is a block diagram of a power supply unit including a charging circuit for charging a secondary battery according to the fourth embodiment of the present invention. In FIG. 8, elements corresponding to those in FIG. 1 are denoted by the same reference numbers, and are not further described. Only the difference between FIG. 8 and FIG. 1 are described herein.

The difference between FIG. 8 and FIG. 1 is that the second direct current power supply 3 shown in FIG. 1 is omitted. Accordingly, the power supply switching circuit unit 12 shown in FIG. 1 is replaced with a power supply switching circuit unit 12c, the charging circuit 5 shown in FIG. 1 is replaced with a charging circuit 5c, and the power supply unit 1 shown in FIG. 1 is replaced with a power supply unit 1c.

As shown in FIG. 8, the power supply unit 1c includes the first direct current power supply 2, the secondary battery 4, and the charging circuit 5c.

The charging circuit 5c includes the charging circuit unit 11 and the power supply switching circuit unit 12c that detects the first voltage V1 and the secondary battery voltage Vb that is the voltage of the secondary battery 4, selects either one of the first voltage V1 or the secondary battery voltage Vb, and outputs the selected voltage as power supply to the charging circuit unit 11. The charging circuit unit 11 operates by using as power supply the voltage received from the power supply switching circuit unit 12c.

A description is given of an example in which a fuel battery is employed as the first direct current power supply 2 serving as a main power supply, and a lithium-ion battery is employed as the secondary battery 4 in the above-described configuration.

The secondary battery voltage Vb of the charged secondary battery 4 (lithium-ion battery) is generally 3.2 V-4.4 V according to its discharge property, so that sufficient voltage for driving the charging circuit unit 11 can be supplied. Therefore, the power supply switching circuit unit 12c determines that the secondary battery 4 (lithium-ion battery) is the optimum power supply, and the secondary battery 4 (lithium-ion battery) is used as the power supply of the charging circuit unit 11.

As energy of the first direct current power supply 2 (fuel battery) is limited, unless it is replenished with fuel, the output voltage drops and it becomes incapable of supplying power. If the first direct current power supply 2 (fuel battery) is not replenished with fuel and becomes incapable of supplying power to the secondary battery 4 (lithium-ion battery), the voltage of the secondary battery 4 (lithium-ion battery) also drops. As a result, a device serving as the load 10 cannot be driven.

In such a situation, information reporting that there is a fuel shortage is sent from the device to a user, and the user replenishes the first direct current power supply 2 (fuel battery) with fuel. When the first direct current power supply 2 (fuel battery) is replenished with fuel, the first direct current power supply 2 (fuel battery) can start supplying power again. However, at this point, the secondary battery 4 (lithium-ion battery) is in an over-discharged status and cannot supply a voltage sufficient for driving the charging circuit unit 11. In such a situation, the power supply switching circuit unit 12c determines that the first direct current power supply 2 (fuel battery) is the optimum power supply, and the first direct current power supply 2 (fuel battery) is used as the power supply for the charging circuit unit 11.

Figure 9:
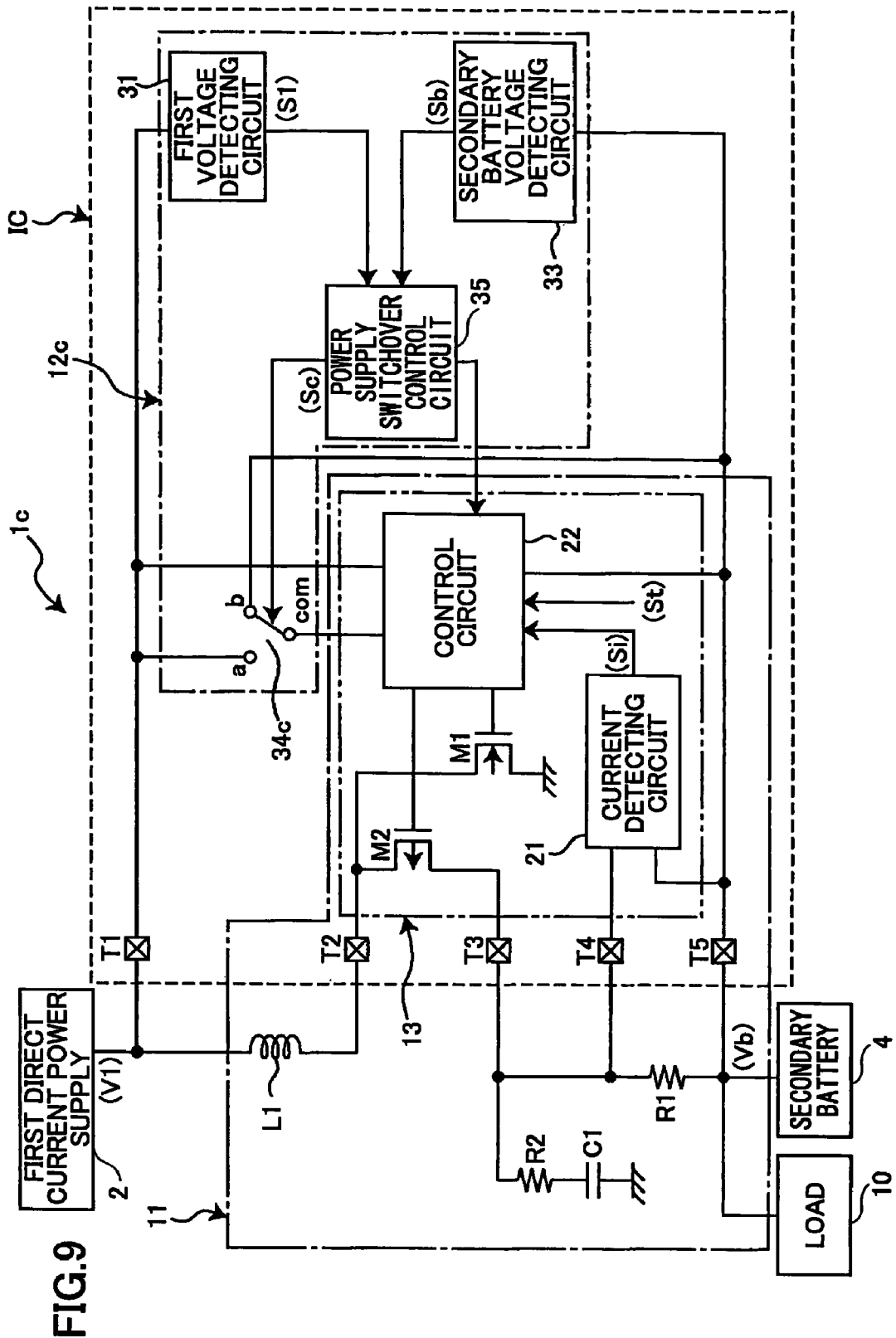
FIG. 9 is a block diagram of the internal configuration of a charging circuit unit and a power supply switching circuit unit shown in FIG. 8.

FIG. 9 is a block diagram of the internal configuration of the charging circuit unit 11 and the power supply switching circuit unit 12c shown in FIG. 8. In FIG. 9, elements corresponding to those in FIG. 2 are denoted by the same reference numbers. Configurations and operations of the charging circuit unit 11 shown in FIG. 9 are the same as those described with FIG. 2, and are thus not further described.

As shown in FIG. 9, the power supply switching circuit unit 12c includes the first voltage detecting circuit 31 and the secondary battery voltage detecting circuit 33. The first voltage detecting circuit 31 detects the voltage level of the first voltage V1 from the first direct current power supply 2 (fuel battery) and generates and outputs the signal S1 indicating the detected voltage level. The secondary battery voltage detecting circuit 33 detects the voltage level of the secondary battery voltage Vb from the secondary battery 4 (lithium-ion battery) and generates and outputs the signal Sb indicating the detected voltage level.

Furthermore, the power supply switching circuit unit 12c includes a switchover switch 34c and the power supply switchover control circuit 35. The switchover switch 34c exclusively outputs either one of the first voltage V1 or the secondary battery voltage Vb according to a control signal received. The power supply switchover control circuit 35 determines the higher voltage of the first voltage V1 or the secondary battery voltage Vb based on signals received from the first voltage detecting circuit 31 and the secondary battery voltage detecting circuit 33, and controls the switchover switch 34c to output the determined voltage to some of or all of elements configuring the charging circuit unit 11 including the control circuit 22. The switching element M1, the synchronous rectification switching element M2, the current detecting circuit 21, and the control circuit 22 included in the charging circuit unit 11, and the power supply switching circuit unit 12c are integrated on a single IC. The IC also includes terminals T1-T5.

The terminal T3 and the terminal T4 are connected to each other externally, the resistance R1 is connected between the terminal T4 and the terminal T5, and the terminal T4 and the terminal T5 are connected to the current detecting circuit 21. The secondary battery voltage Vb is input to the control circuit 22, the terminal b of the switchover switch 34c, and the secondary battery voltage detecting circuit 33, via the terminal T5. The load 10 is connected to the terminal T5 and receives power supply. The control circuit 22 is connected to the common terminal com of the switchover switch 34c, and receives power supply from the common terminal com. The switchover switch 34c is controlled according to the control signal Sc from the power supply switchover control circuit 35. The first voltage V1 is input to the terminal a of the switchover switch 34c.

In the above-described configuration, the first voltage detecting circuit 31 and the secondary battery voltage detecting circuit 33 detect the connection status and the output voltage of the first direct current power supply 2 (fuel battery) and the secondary battery 4 (lithium-ion battery), respectively. The first voltage detecting circuit 31 and the secondary battery voltage detecting circuit 33 respectively output to the power supply switchover control circuit 35 the signal S1 and the signal Sb indicating the detection results. The power supply switchover control circuit 35 controls the switchover switch 34c according to the signals S1 and Sb so that power supply for some of or all of elements configuring the charging circuit unit 11 including the control circuit 22 is supplied via the switchover switch 34c from the optimum power supply of the first direct current power supply 2 (fuel battery) or the secondary battery 4 (lithium-ion battery).

As described above, in the charging circuit 5 for the secondary battery 4 according to the fourth embodiment of the present invention, the power supply switching circuit unit 12c detects the higher voltage of the first voltage V1 generated by the first direct current power supply 2 such as a fuel battery or a solar battery, and the secondary battery voltage Vb that is the voltage of the secondary battery 4. The power supply switching circuit unit 12c then outputs the higher voltage as power supply to the charging circuit unit 11. The charging circuit unit 11 operates by using as power supply the voltage received from the power supply switching circuit unit 12c. Accordingly, the same effects as those of the first embodiment can be achieved.

According to one embodiment of the present invention, even if the voltage of a direct current power supply used as the main power supply such as a fuel battery or a solar battery is lower than a voltage required for driving a charging circuit, it is possible to control the operation of charging a secondary battery, ensure that a device corresponding to the load is operable under any circumstance, and minimize power supplied from the direct current power supply that has only a limited amount of power, such that efficiency is enhanced.

The present invention is not limited to the specifically disclosed embodiment, and variations and expansions may be made without departing from the scope of the present invention.

The present application is based on Japanese Priority Patent Application No. 2006-037506, filed on Feb. 15, 2006, the entire contents of which are hereby incorporated by reference.

The invention claimed is:

1. A charging circuit for charging a secondary battery by using a first direct current power supply that generates and outputs a first voltage, the charging circuit comprising: a charging circuit unit configured to charge the secondary battery with only the first voltage received from the first direct current power supply; and a power supply switching circuit unit configured to receive the first voltage from the first direct current power supply, a second voltage generated from power supplied from outside, and a secondary battery voltage from the secondary battery, and supply as a power supply a highest voltage among the received voltages to the charging circuit unit, wherein the charging circuit unit operates by using, as the power supply, the highest voltage received from the power supply switching circuit unit;

and wherein the charging circuit unit uses as the power supply a third voltage generated by boosting the first voltage to charge the secondary battery with a constant current or a constant voltage; wherein the charging circuit unit includes an inductor including a terminal to which the first voltage is input, a switching element configured to perform a first switching operation according to a first control signal input to a first control electrode thereof, the switching element being connected between another terminal of the inductor and ground voltage, a synchronous rectification switching element configured to perform a second switching operation contrary to the first switching operation performed by the switching element according to a second control signal input to a second control electrode thereof to control a charging current supplied to the secondary battery, the synchronous rectification switching element being connected to the another terminal of the inductor, a current detecting circuit unit configured to detect a current level of the charging current supplied to the secondary battery and generate and output a signal indicating the detected current level, and a control circuit unit configured to control the first switching operation performed by the switching element and the second switching operation performed by the synchronous rectification switching element according to the secondary battery voltage and the signal received from the current detecting circuit unit.

2. A charging circuit for charging a secondary battery by using a first direct current power supply that generates and outputs a first voltage, the charging circuit compromising:

a charging circuit unit configured to charge the second battery with the first voltage received from the direct current power supply; and a power supply switching circuit unit configured to receive the first voltage from the first direct current power supply, a second voltage generated from power supplied from outside, and a secondary battery voltage from the secondary battery, and supply as a power supply a highest voltage amomg the received voltages to the charging circuit unit, wherein the power supply switching circuit unit includes a first voltage detecting circuit configured to detect a voltage level of the voltage and generate and output a signal indicating the detected voltage level, a second voltage detecting circuit configured to detect a voltage level of the second voltage and generate and output a signal indicating the detected voltage level, a secondary battery voltage detecting circuit configured to detect a voltage level of the secondary battery voltage and generate and output a signal indicating the detected voltage level, a switchover switch configured to receive a control signal and output as the power supply to the charging circuit unit one of the first voltage, the second voltage, and the secondary battery voltage according to the control signal, and a power supply switchover control circuit configured to send the control signal to the switchover switch according to the signals received from the first voltage detecting circuit, the second voltage detecting circuit, and the secondary battery voltage detecting circuit, wherein the power supply switchover control circuit detects the voltage level of the first voltage from the signal received from the first voltage detecting circuit, the voltage level of the second voltage from the signal received from the second voltage detecting circuit, and the voltage level of the secondary battery voltage from the signal received from the secondary battery voltage detecting circuit, selects the highest voltage among the first voltage, the second voltage, and the secondary battery voltage, and sends the control signal to the switchover switch to cause the switchover switch to output the selected voltage to the charging circuit unit.

3. The charging circuit according to claim 2, wherein the charging circuit unit uses as the power supply a third voltage generated by boosting the first voltage to charge the secondary battery with a constant current or a constant voltage.

4. The charging circuit according to claim 3, wherein the charging circuit unit includes an inductor including a terminal to which the first voltage is input, a switching element configured to perform a first switching operation according to a first control signal input to a first control electrode thereof, the switching element being connected between another terminal of the inductor and ground voltage, a synchronous rectification switching element configured to perform a second switching operation contrary to the first switching operation performed by the switching element according to a second control signal input to a second control electrode thereof to control a charging current supplied to the secondary battery, the synchronous rectification switching element being connected to the another terminal of the inductor, a current detecting circuit unit configured to detect a current level of the charging current supplied to the secondary battery and generate and output a signal indicating the detected current level, and a control circuit unit configured to control the first switching operation performed by the switching element and the second switching operation performed by the synchronous rectification switching element according to the secondary battery voltage and the signal received from the current detecting circuit unit.

5. The charging circuit according to claim 1, wherein the control circuit unit includes a reference voltage source circuit unit configured to generate and output a predetermined reference voltage, a reference current source circuit unit configured to generate and output a predetermined reference current, a charging voltage control circuit unit configured to supply the constant voltage to the secondary battery by controlling the first switching operation performed by the switching element and the second switching operation performed by the synchronous rectification switching element such that a voltage proportionate to the secondary battery voltage becomes the reference voltage, a charging current control circuit unit configured to supply the constant current to the secondary battery by controlling the first switching operation performed by the switching element and the second switching operation performed by the synchronous rectification switching element such that the current level detected by the current detecting circuit unit becomes equal to that of the reference current, and a charging operation selecting circuit unit configured to cause either one of the charging voltage control circuit unit or the charging current control circuit unit to charge the secondary battery following a predetermined sequence by controlling the charging voltage control circuit unit and the charging current control circuit unit.

6. The charging circuit according to claim 4, wherein the control circuit unit includes a reference voltage source circuit unit configured to generate and output a predetermined reference voltage, a reference current source circuit unit configured to generate and output a predetermined reference current, a charging voltage control circuit unit configured to supply the constant voltage to the secondary battery by controlling the first switching operation performed by the switching element and the second switching operation performed by the synchronous rectification switching element such that a voltage proportionate to the secondary battery voltage becomes the reference voltage, a charging current control circuit unit configured to supply the constant current to the secondary battery by controlling the first switching operation performed by the switching element and the second switching operation performed by the synchronous rectification switching element such that the current level detected by the current detecting circuit unit becomes equal to that of the reference current, and a charging operation selecting circuit unit configured to cause either one of the charging voltage control circuit unit or the charging current control circuit unit to charge the secondary battery following a predetermined sequence by controlling the charging voltage control circuit unit and the charging current control circuit unit.

7. The charging circuit according to claim 5, wherein the current detecting circuit unit includes
a resistance configured to convert the charging current supplied to the secondary battery to a voltage, and
a detecting unit configured to generate and output the signal indicating the current level of the charging current based on voltages at both edges of the resistance, wherein
the switching element, the synchronous rectification switching element, the current detecting circuit unit, the control circuit unit, and the power supply switching circuit unit are integrated on a single IC.

8. The charging circuit according to claim 6, wherein the current detecting circuit unit includes
a resistance configured to convert the charging current supplied to the secondary battery to a voltage, and
a detecting unit configured to generate and output the signal indicating the current level of the charging current based on voltages at both edges of the resistance, wherein
the switching element, the synchronous rectification switching element, the current detecting circuit unit, the control circuit unit, and the power supply switching circuit unit are integrated on a single IC.

9. The charging circuit according to claim 2, wherein the switchover switch includes at least a switch element and a diode that prevents a countercurrent.

10. The charging circuit according to claim 2, wherein the secondary battery is a lithium-ion battery.

11. The charging circuit according to claim 3, wherein the secondary battery is a lithium-ion battery.

12. The charging circuit according to claim 1, wherein the secondary battery is a lithium-ion battery.

13. The charging circuit according to claim 4, wherein the secondary battery is a lithium-ion battery.

14. The charging circuit according to claim 5, wherein the secondary battery is a lithium-ion battery.

15. The charging circuit according to claim 6, wherein the secondary battery is a lithium-ion battery.

16. The charging circuit according to claim 7, wherein the secondary battery is a lithium-ion battery.

17. The charging circuit according to claim 8, wherein the secondary battery is a lithium-ion battery.

18. The charging circuit according to claim 9, wherein the secondary battery is a lithium-ion battery.

19. The charging circuit according to claim 2, wherein the secondary battery is an electric double layer capacitor.

20. The charging circuit according to claim 3, wherein the secondary battery is an electric double layer capacitor.

21. The charging circuit according to claim 1, wherein the secondary battery is an electric double layer capacitor.

22. The charging circuit according to claim 4, wherein the secondary battery is an electric double layer capacitor.

23. The charging circuit according to claim 5, wherein the secondary battery is an electric double layer capacitor.

24. The charging circuit according to claim 6, wherein the secondary battery is an electric double layer capacitor.

25. The charging circuit according to claim 7, wherein the secondary battery is an electric double layer capacitor.

26. The charging circuit according to claim 8, wherein the secondary battery is an electric double layer capacitor.

27. The charging circuit according to claim 9, wherein the secondary battery is an electric double layer capacitor.

28. The charging circuit according to claim 2, wherein the first direct current power supply is a fuel battery or a solar battery.

29. The charging circuit according to claim 3, wherein the first direct current power supply is a fuel battery or a solar battery.

30. The charging circuit according to claim 1, wherein the first direct current power supply is a fuel battery or a solar battery.

31. The charging circuit according to claim 4, wherein the first direct current power supply is a fuel battery or a solar battery.

32. The charging circuit according to claim 5, wherein the first direct current power supply is a fuel battery or a solar battery.

33. The charging circuit according to claim 6, wherein the first direct current power supply is a fuel battery or a solar battery.

34. The charging circuit according to claim 7, wherein the first direct current power supply is a fuel battery or a solar battery.

35. The charging circuit according to claim 8, wherein the first direct current power supply is a fuel battery or a solar battery.

36. The charging circuit according to claim 9, wherein the first direct current power supply is a fuel battery or a solar battery.

* * * * *